United States Patent
Resh

[11] Patent Number: 5,805,381
[45] Date of Patent: Sep. 8, 1998

[54] HYGROSCOPICALLY BALANCED GIMBAL STRUCTURE

[75] Inventor: Roger A. Resh, Prior Lake, Minn.

[73] Assignee: Seagate Technology, Inc., Scotts Valley, Calif.

[21] Appl. No.: 721,255

[22] Filed: Sep. 26, 1996

Related U.S. Application Data

[60] Provisional application No. 60/021,507, Jul. 10, 1996.
[51] Int. Cl.⁶ .............................. G11B 5/48; G11B 33/14
[52] U.S. Cl. ........................................ 360/104; 360/97.02
[58] Field of Search ..................................... 360/104, 106, 360/97.02, 97.03, 97.04

[56] References Cited

U.S. PATENT DOCUMENTS 5,597,496  1/1997  Masaichi et al. ....................... 360/104

*Primary Examiner*—Craig A. Renner
*Attorney, Agent, or Firm*—Westman, Champlin & Kelly, P.A.

[57] ABSTRACT

A gimbal structure comprises a gimbal, a dielectric layer attached to the gimbal and subjecting the gimbal to hygroscopic deformation, and a plurality of conductors attached to the dielectric layer. A hygroscopic balancer is attached to the gimbal and hygroscopically opposes the hygroscopic deformation subjected by the dielectric layer to reduce net hygroscopic deformation of the gimbal.

20 Claims, 5 Drawing Sheets

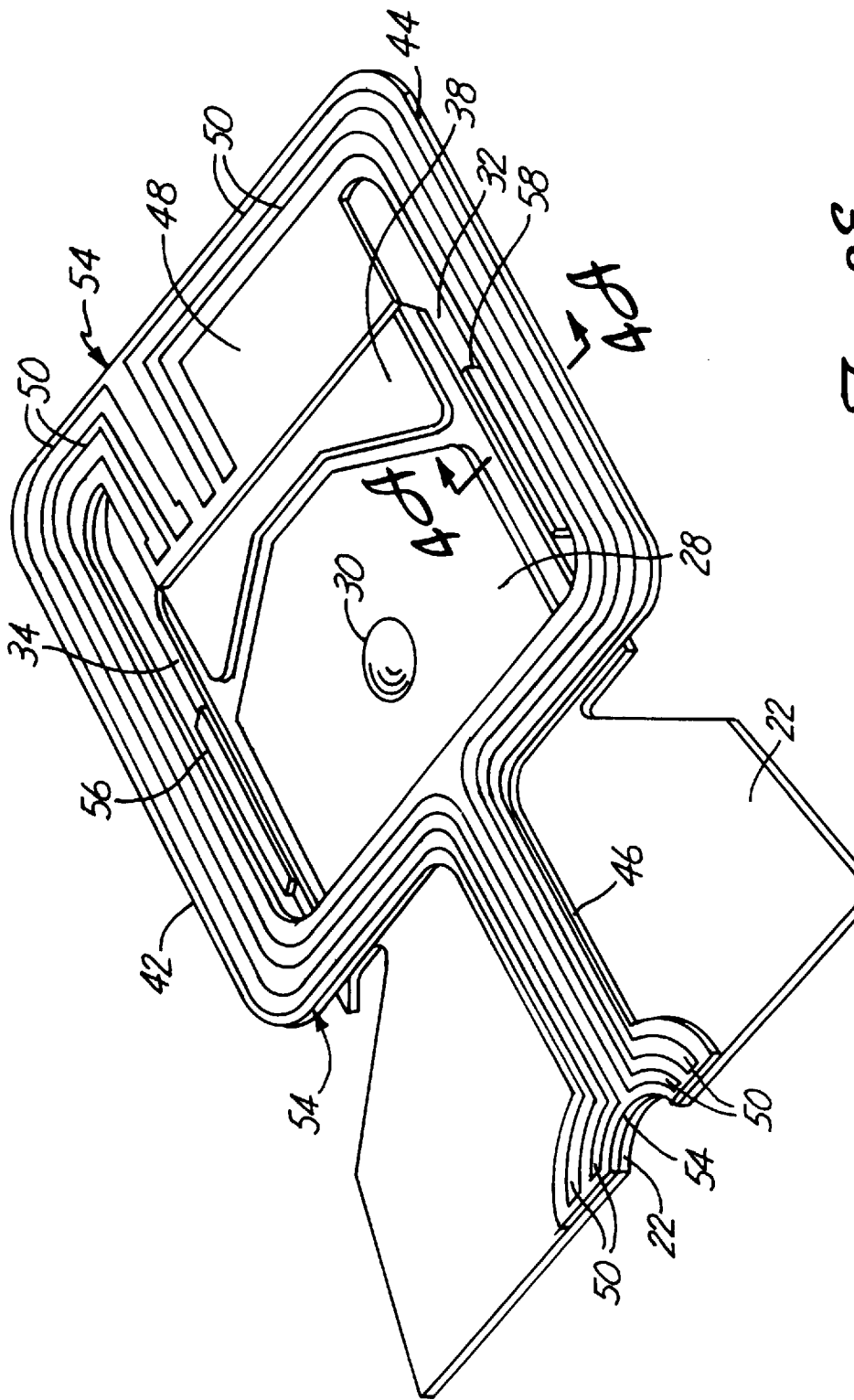

HYGROSCOPICALLY BALANCED GIMBAL STRUCTURE

REFERENCE TO RELATED APPLICATION

This application claims the priority of an earlier filed co-pending provisional patent application of Roger Alan Resh, Ser. No. 60/021,507, filed Jul. 10, 1996 entitled HYGROSCOPICALLY BALANCED GIMBAL STRUCTURE.

BACKGROUND OF THE INVENTION

The present invention relates to disc drives. More specifically, the present invention relates to a hygroscopically balanced gimbal structure for supporting a hydrodynamic air bearing over a rotating magnetic medium.

Disc drives are the primary devices employed for mass storage of computer programs and data used in computer systems. Within a disc drive, a load beam supports a hydrodynamic air bearing (or slider) proximate a rotating magnetic disc. The load beam supplies a downward force that counteracts the hydrodynamic lifting force developed by the air bearing. The slider carries a magnetic transducer for communicating with individual bit positions on the rotating magnetic disc.

The load beam is coupled to an actuator arm which is, in turn, coupled to an actuator system. The actuator system positions the slider, and hence the transducer, relative to the disc to access desired tracks on the disc.

A gimbal structure is typically located between the load beam and the slider. The gimbal resiliently supports the slider and allows it to pitch and roll while it follows the topography of the rotating disc.

Traditionally, the magnetic transducer was electrically coupled to the remainder of the disc drive electronic by means of twisted pair wires. However, the wires exerted a bias force on the slider to such an extent that the fly height of the slider (and possibly other flying characteristics) was adversely affected.

Recent advances have addressed the limitations of twisted pair wire connections by employing an etched circuit on the gimbal. The etched circuit is referred to as a trace suspension assembly. The etched circuit is typically comprised of etched copper conductors bonded to a dielectric material. The dielectric material is, in turn, bonded to the gimbal. The circuit can be built very thin, often less than 0.002 inches thick. The circuit is attached to the gimbal and electrically couples the magnetic transducer to the disc drive electronics. Because the circuit can be built so thin, bias force on the slider is reduced from that of the twisted pair wires. However, the introduction of the dielectric material to the gimbal assembly has created new problems.

The dielectric material absorbs moisture from the air, and swells as a result. However, metals such as stainless steel (typically used for gimbals) and copper (typically used for conductors) do not possess the same hygroscopic expansion characteristics as the dielectric material and thus do not absorb moisture and swell. The differences in hygroscopic expansion coefficients of the different materials in the gimbal assembly yields a gimbal assembly that deflects in response to changes in relative humidity. Such deflection can change the attitude of the slider and thus cause variation in the slider fly height with variations in relative humidity. If the slider flies too low, it crashes on the magnetic disc, potentially destroying both the transducer and the disc itself. Conversely, if the slider flies too high, the magnetic transducer is not able to read the magnetic fields at each bit position, and data transmission ceases.

SUMMARY OF THE INVENTION

There is a need to provide a gimbal assembly that is essentially unaffected by changes in relative humidity while remaining sufficiently resilient to allow the slider to follow the topography of the disc.

The present invention is directed to a gimbal structure which reduces hygroscopic deformation. The gimbal structure comprises a gimbal, a dielectric layer attached to the gimbal, and a plurality of conductors attached to the dielectric layer. Hygroscopic balancers are attached to the gimbal and are configured to reduce hygroscopic deformation of the gimbal assembly.

BRIEF DESCRIPTION OF THE DRAWINGS

FIGS. 3D and 3E show the layers of FIGS. 3A–3C assembled with respect to one another.

DETAILED DESCRIPTION OF THE PREFERRED EMBODIMENTS

Figure 1:
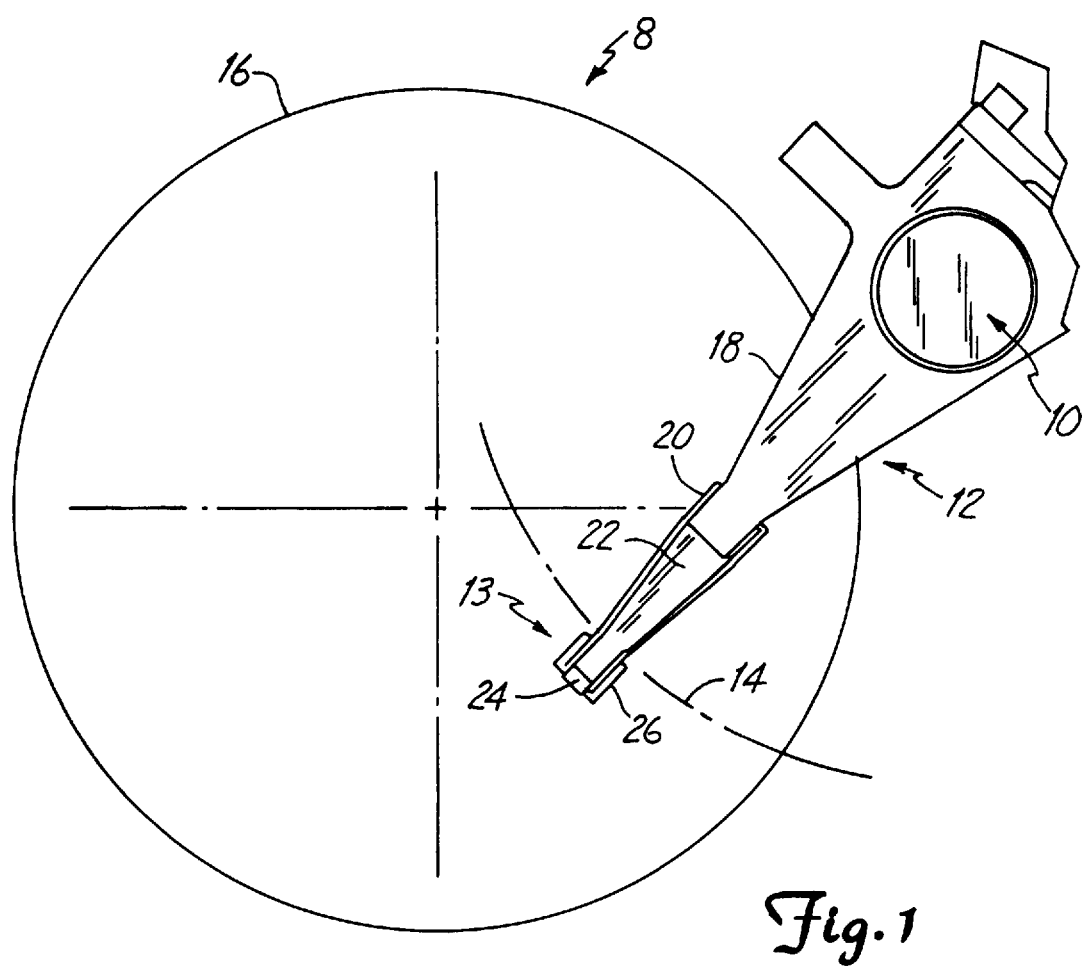
FIG. 1 is a plan view of a portion of a disc drive in which a load arm supports a head gimbal assembly, embodying features of the present invention, over a magnetic disc.

FIG. 1 illustrates a portion of a disc drive 8 according to the present invention. Disc drive 8 includes actuator 10, actuator arm assembly 12 and head/gimbal assembly 13. Actuator arm assembly 12 includes actuator arm 18 which is coupled to actuator 10 and has load beam supporting portion 20 at one end thereof. Load beam 22 is coupled to actuator arm 18 at end 20, and is also coupled to head gimbal assembly 13. Head gimbal assembly 13 includes gimbal (or flexure) 24, slider 26 and a transducer (not shown). Gimbal 24 couples slider 26 to load beam 22. Gimbal 24 can either be a separate flexure assembly or an integrated suspension assembly which is integrated with load beam 22.

In operation, actuator arm assembly 12 and load beam 22 support head gimbal assembly 13 relative to a surface of disc 16. The attitude of the hydrodynamic bearing surface of slider 26 relative to the surface of disc 16 affects the flying characteristics (including the fly height) of head gimbal assembly 13. As disc 16 rotates, slider 26, which includes a hydrodynamic bearing surface, develops a hydrodynamic lifting force causing slider 26 to "fly" above the surface of disc 16. road beam 22 exerts a counteracting bias force holding slider 26, and hence the transducer coupled to slider 26, at a desired position over the surface of disc 16. In the embodiment shown in FIG. 1, actuator 10 is a rotary actuator which rotates causing head gimbal assembly 13 to move about arc 14 to access various tracks on the surface of disc 16.

Figure 2C:
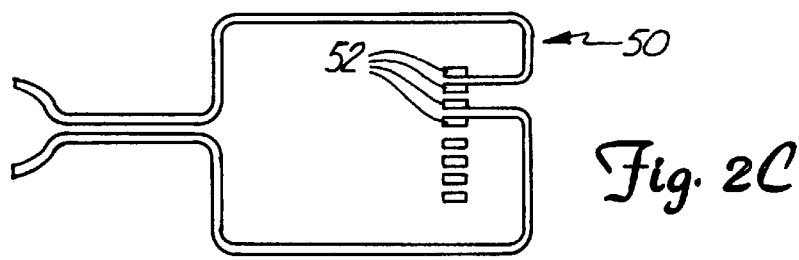
FIGS. 2A–2C show different layers of a gimbal structure.
Figure 2B:
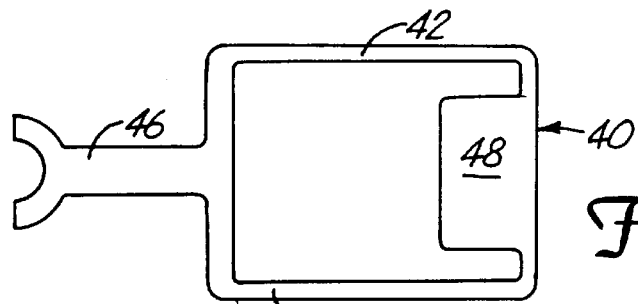
Figure 2A:
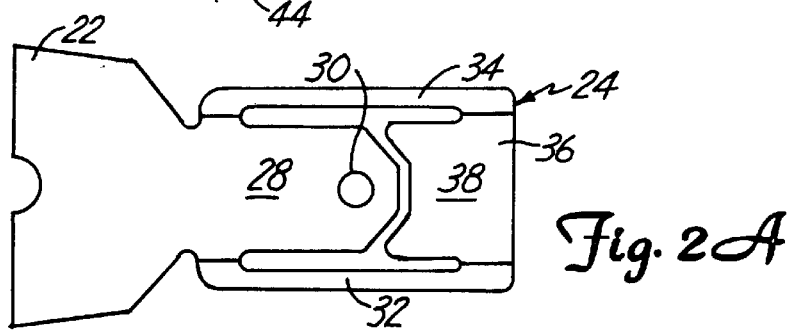

FIGS. 2A–2C show three layers of a trace suspension assembly which forms the gimbal structure. In the embodiment shown in FIGS. 2A–2C, gimbal (or flexure) 24 comprises a stainless steel integrated suspension assembly, rather than a separate gimbal member. Of course, the present invention can also be implemented in a system in which the gimbal is comprised of a gimbal member which is separate from, but attached to, the load beam. Such systems are well known. Gimbal 24 includes dimple tongue 28 which extends away from load beam 22. Dimple tongue 28 includes dimple 30 in one end thereof. Gimbal 24 also includes a plurality of struts 32 and 34 which extend away from load beam 22 and which support cross-member 36. Cross-member 36 extends back toward dimple tongue 28 to form slider mounting tongue 38. In one preferred embodiment, slider 26 is attached to slider mounting tongue 38 and abuts dimple 30. Therefore, slider 26 can pitch and roll about (i.e., gimbal about) dimple 30 to follow the topography of the surface of disc 16.

FIG. 2B shows a dielectric layer 40. In the preferred embodiment, dielectric layer 40 is a polyimide material. Dielectric layer 40 lies over gimbal 24 to provide insulation between gimbal 24 and the conductors which provide electrical contact between the transducer mounted on slider 26 and the rest of the drive electronics. In the preferred embodiment, dielectric layer 40 is configured (material is actually etched away) to include outboard struts 42 and 44, neck 46 and tab 48.

FIG. 2C illustrates a plurality of conductors (collectively designated by numeral 50) which lie over dielectric layer 40. Conductors 50 are preferably etched or deposited copper material and terminate in bonding pads 52 which can be easily bonded to desired locations on slider 26 to make electrical contact with the transducer carried by slider 26.

Figure 2D:
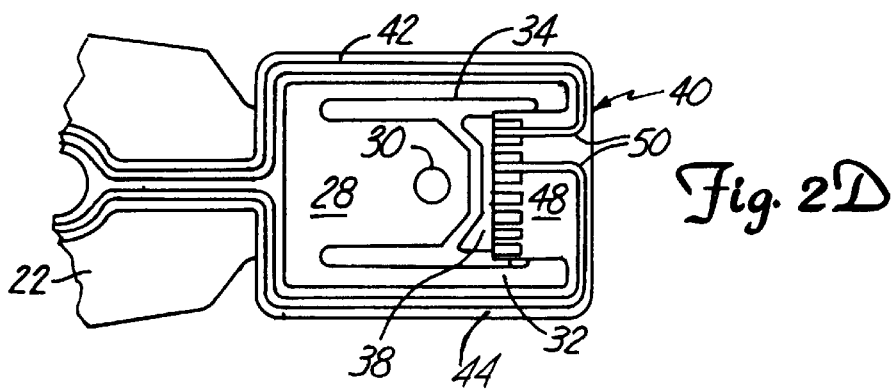
FIG. 2D shows the layers of FIGS. 2A–2C assembled with respect to one another.

FIG. 2D illustrates the gimbal layer 24, dielectric layer 40 and conductor 50 coupled to one another. It can be seen that outboard struts 42 and 44 of dielectric layer 40 are positioned such that they lie outboard of (i.e., are not supported by) struts 32 and 34 substantially along the entire length thereof. It can also be seen that conductors 50 are positioned such that they lie on top of dielectric layer 40 so that they do not make electric contact with gimbal 24.

Figure 2E:
FIGS. 2E and 2F illustrate hygroscopic deflection of the gimbal structure shown in FIGS. 2A–2D.
Figure 2F:

FIGS. 2E and 2F illustrate hygroscopic deflection which the gimbal structure shown in FIGS. 2A–2C can undergo under varying humidity conditions. FIG. 2E illustrates a portion of dielectric strut 44 (which is preferably polyimide) with conductors 50 (which are preferably copper) disposed thereon. FIG. 2E illustrates the materials shown therein in a first, relatively low, relative humidity environment.

As the humidity in the environment increases, the polyimide dielectric material forming strut 44 has hygroscopic characteristics which cause it to absorb moisture from the environment. As dielectric layer 40 absorbs moisture, strut 44 begins to swell. However, since copper does not share the same hygroscopic expansion coefficient as polyimide (e.g., copper does not absorb moisture from the atmosphere and swell), the swelling of strut 44 induces deflection forces in the structure. As layer 44 absorbs moisture from the environment, bowing of the material combination occurs. This is illustrated in FIG. 2F. Similar bowing occurs in strut 42 on the opposite side of the gimbal structure.

When this bowing occurs, a bias torque arises on the air bearing. This bias torque causes an undesirable change in fly height of the air bearing surface of the slider 26 relative to the surface of the disc 16.

Attempts have been made to reduce this type of hygroscopic deformation of the gimbal structure by increasing the stiffness of the gimbal structure. This has been attempted by either increasing the thickness of the copper conductors 50, or increasing the thickness of the stainless steel gimbal 24, or both. However, the resultant increase in stiffness of the gimbal structure increased torque on the slider and reduced the gimbal structure's ability to allow the slider 26 to fly at the desired spacing from the disc 16. It also affected the gimbal structure's ability to allow the slider 26 to pitch and roll and thus limited the ability of the slider 26 to follow the topography of the surface of disc 16.

Figure 3C:
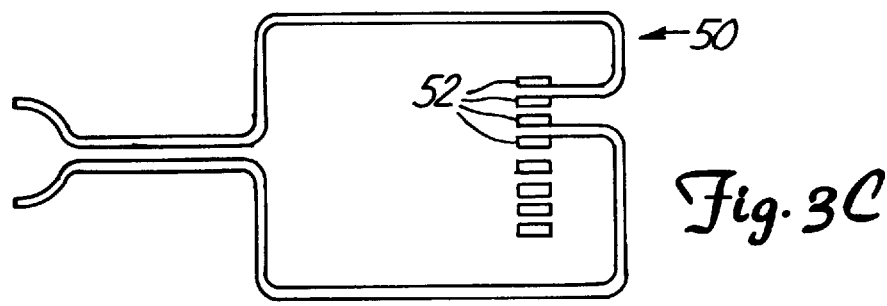
FIGS. 3A–3C illustrate layers of a gimbal structure according to the present invention.
Figure 3B:
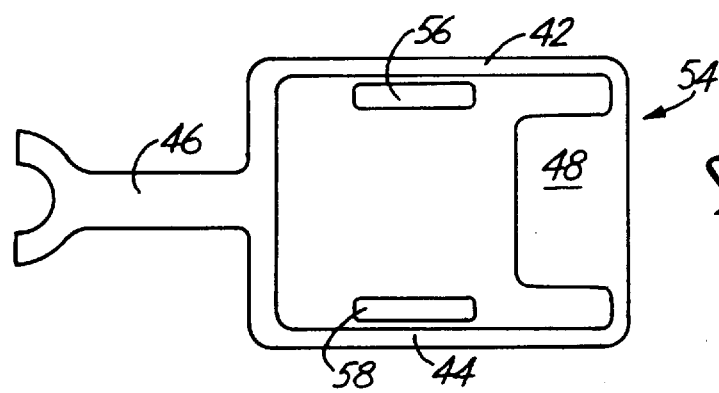
Figure 3A:
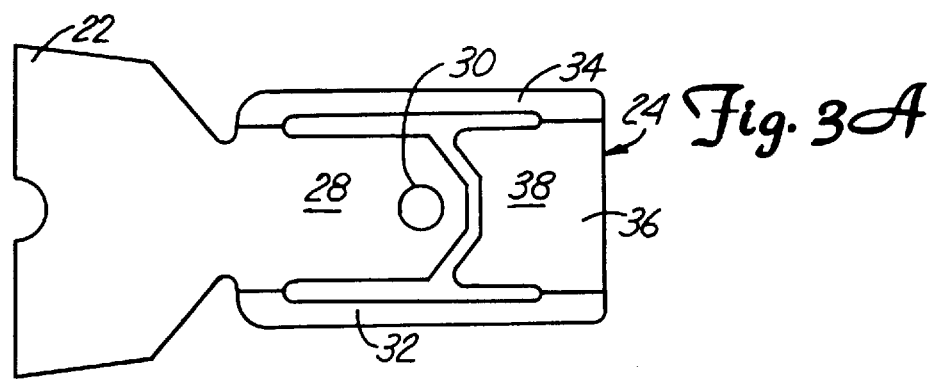

FIGS. 3A–3C show layers of a gimbal structure according to the present invention. Similar items are similarly numbered to those shown in FIGS. 2A–2C. The gimbal 24 and conductors 50 shown in FIGS. 3A and 3C are substantially identical to those shown in FIGS. 2A and 2C. Also, a large portion of the dielectric layer 54 shown in FIG. 3B is similar to the dielectric layer 40 shown in FIG. 2B. However, dielectric layer 54 also includes a pair of hygroscopic balancers 56 and 58.

In the preferred embodiment, all of the three layers shown in FIGS. 3A–3C are provided as one laminated sheet of material. In other words, the material is provided as a layer of copper and a layer of stainless steel which are laminated on opposite sides of a layer of polyimide dielectric material. Various portions of each material are removed by etching to obtain the structure shown in the figures. Therefore, in the preferred embodiment, hygroscopic balancers 56 and 58 are preferably portions of dielectric layer 54 which are masked so that they are not etched away during the formation process.

Figure 3D:
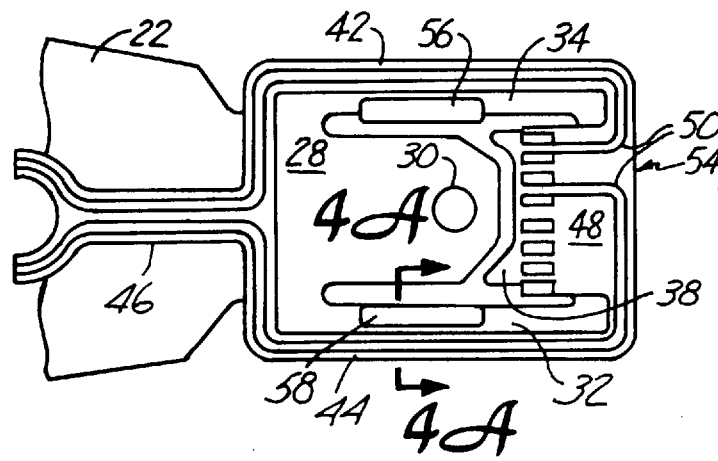

FIGS. 3D and 3E illustrate the layers of FIGS. 3A–3C coupled relative to one another in the preferred manner. FIGS. 3D and 3E illustrate that, in the preferred embodiment, hygroscopic balancers 56 and 58 are positioned such that they directly overlie struts 32 and 34 of gimbal 24. However, outboard of struts 32 and 34, the dielectric layer includes struts 42 and 44 which support the copper conductors. The copper conductors on the outboard struts 42 and 44 lie on a side of the dielectric layer 54 which is opposite that of the stainless steel gimbal structure 24 which underlies hygroscopic balancers 56 and 58. This yields the configuration shown in FIG. 4A.

Figure 4B:
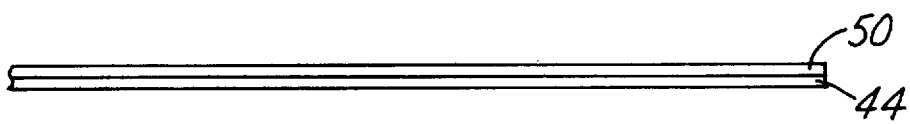
FIGS. 4B–4E illustrate hygroscopic balancing of the gimbal structure shown in FIGS. 3A–3E.
Figure 4A:
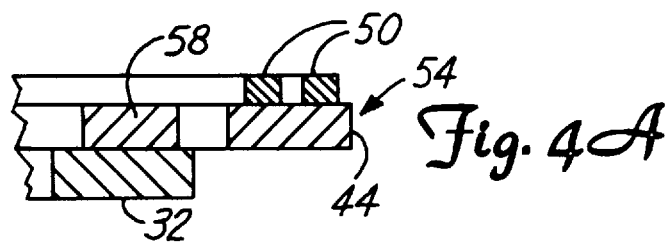
FIG. 4A is a cross-sectional view of a portion of the gimbal structure shown in FIGS. 3D and 3E.

FIG. 4A is a cross-sectional view of a portion of the gimbal structure shown in FIGS. 3D and 3E, and taken along section lines 4A—4A. FIG. 4A more clearly shows that a stainless steel strut 32 of gimbal 24 lies on a first side of the portion of dielectric layer 54 which forms hygroscopic balancer 58. FIG. 4A also shows that the copper conductors 50 lie on an opposite side of a portion of dielectric layer 54 which forms the outboard strut 44.

Figure 4C:
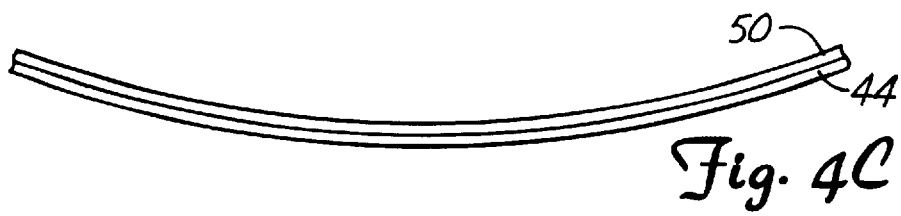

FIGS. 4B–4E illustrate the balancing affect provided by hygroscopic balancers 56 and 58. FIG. 4B illustrates a strut 44 and conductor 50 residing thereon in an environment having a first humidity, such as a relatively low humidity FIG. 4C illustrates the same portion of the gimbal structure in an environment in which the humidity has significantly increased. As discussed with respect to FIGS. 2E and 2F, this causes deflection forces to be induced in the gimbal structure which can tend to cause outboard strut 44 of dielectric layer 54 and conductors 50 residing thereon to deflect. The hygroscopic growth of strut 44 coupled with the hygroscopic stability of conductor 50 tends to cause the combination to deflect concavely toward the conductor 50.

Figure 4D:
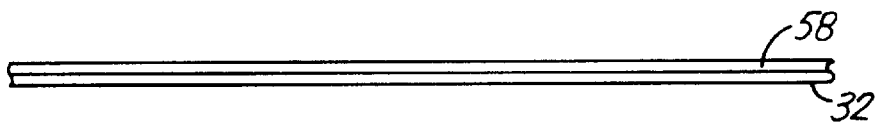

However, FIG. 4D illustrates a portion of stainless steel gimbal strut 32 with hygroscopic balancer 58 disposed thereon. In FIG. 4D, hygroscopic balancer 58 and gimbal strut 32 are provided in the same environment as that in FIG.

Figure 4E:
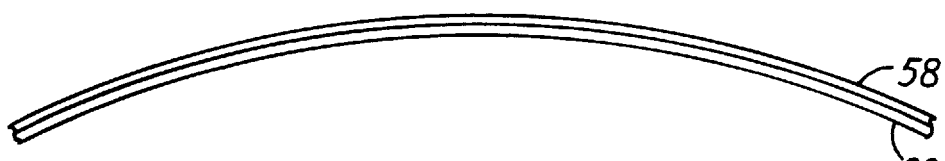

4B. However, FIG. 4E shows the tendency of hygroscopic balancer 58 and stainless steel strut 32 in an environment which has a relative humidity that has substantially increased over that shown in FIG. 4D. In such environment, hygroscopic balancer 58 absorbs moisture and swells and tends to exert a deflection force on the gimbal structure so that it deflects as shown in FIG. 4E.

It can be seen that the deflection forces exerted by the portions of dielectric layer 54 on the gimbal structure are directly opposite one another in the portion of the gimbal structure which contains hygroscopic balancers 56 and 58, and the portion of the gimbal structure which contains dielectric struts 42 and 44. Because the hygroscopic deformation force induced by hygroscopic balancers 56 and 58 opposes the hygroscopic deformation force induced in the area of conductors 50 and struts 42 and 44, the two deformations forces (when the balancers 56 and 58 are sized appropriately) directly cancel one another out to provide a flat gimbal structure under substantially all humidity conditions.

In the preferred embodiment, the copper conductors 50 can be any suitable thickness but are preferably on the order of 0.71 mils. In addition, as with the copper conductors, the dielectric layer 54 can also be any suitable thickness but is also on the order of 0.71 mils in thickness. Further, the stainless steel gimbal 24 is of a suitable thickness, preferably on the order of 2.5 to 0.91 mils.

The present invention was tested using finite element simulations. The pitch stiffness and roll stiffness for the gimbal structure shown in FIGS. 2A–2D was measured. Also, the change in the pitch angle of a slider mounted to the gimbal structure of FIGS. 2A–2D was measured at a first relative humidity and a second relative humidity wherein the second relatively humidity was 85% higher than the first relative humidity. The pitch stiffness of that embodiment was 0.73 $\mu$N–m/deg, the roll stiffness was 1.67 $\mu$N–m/deg and the change in pitch angle between the two relative humidities was 0.560°.

The same simulations were conducted for the gimbal structure shown in FIGS. 3A–3E. The simulations indicated that the pitch stiffness was 0.77 $\mu$N–m/deg, the roll stiffness was 1.72 $\mu$N–m/deg but the pitch angle only increased by 0.02°. Thus, the embodiment shown in FIGS. 3A–3E has substantially no effect or impact on gimbal stiffness. Further, the small increase in stiffness, combined with the large reduction in pitch angle change indicates that the risk of fly height change from a change in relative humidity is greatly reduced over the embodiment shown in FIGS. 2A–2D. It should also be noted that, in a preferred embodiment, hygroscopic balancers 56 and 58 can be obtained substantially without adding any production costs. Substantially, the only additional steps which must be followed to implement the present is that the areas corresponding to balancers 56 and 58 must be masked during the etching process. Thus, the present invention provides significant advantages in a very economic and efficient way.

The amount of balancing torque provided by the hygroscopic balancers according to the present invention is proportional to the length, width and thickness of the balancers. Finite element models, using computer simulation, can easily be used to obtain the necessary dimensions of the hygroscopic balancers in order to obtain a zero angle hygroscopic deflection.

Although the present invention has been described with reference to preferred embodiments, workers skilled in the art will recognize that changes may be made in form and detail without departing from the spirit and scope of the invention.

What is claimed is:

1. A gimbal structure for supporting a slider in a disc drive, the gimbal structure comprising:
    a gimbal;
    a dielectric layer attached to the gimbal and subjecting the gimbal to hygroscopic deformation;
    a plurality of conductors attached to the dielectric layer; and
    a hygroscopic balancer attached to the gimbal and hygroscopically opposing the hygroscopic deformation subjected by the dielectric layer to reduce net hygroscopic deformation of the gimbal.

2. The gimbal structure of claim 1 wherein the gimbal includes:
    a first surface and a second surface; and
    the dielectric layer includes a first surface and a second surface, the second surface of the dielectric layer being attached to the first surface of the gimbal, and the first surface of the dielectric layer supporting the conductors.

3. The gimbal structure of claim 2 wherein the hygroscopic balancer is attached to the first surface of the gimbal.

4. The gimbal structure of claim 2 wherein the gimbal further comprises:
    a support arm coupling end, a cross-member, and a plurality of gimbal struts extending from the support arm coupling end to the cross-member.

5. The gimbal structure of claim 4 wherein the dielectric layer includes:
    a plurality of dielectric struts lying substantially outside of the gimbal struts.

6. The gimbal structure of claim 5 wherein the plurality of dielectric struts supports the plurality of conductors.

7. The gimbal structure of claim 5 wherein the hygroscopic balancer is positioned on one of the plurality of gimbal struts.

8. The gimbal structure of claim 7 and further comprising:
    a second hygroscopic balancer positioned on a second of the plurality of gimbal struts.

9. The gimbal structure of claim 8 wherein the hygroscopic balancers are strips of dielectric material.

10. The gimbal structure of claim 1 wherein the dielectric layer introduces a varying deflection force under varying humidity conditions and wherein the hygroscopic balancer is configured to oppose the varying deflection force.

11. The gimbal structure of claim 10 wherein the hygroscopic balancer is formed of the same material as the dielectric layer and is configured to substantially offset the varying deflection force introduced by the dielectric layer.

12. The gimbal structure of claim 1 wherein the dielectric layer is polyimide.

13. A gimbal, comprising:
    a flexure structure for supporting a slider, the flexure structure including a first material which deforms with changes in environmental humidity conditions; and
    a balancing structure, coupled to the flexure structure, which deforms with changes in environmental humidity conditions, wherein deformation of the balancing structure opposes deformation of the first material.

14. The gimbal of claim 13 wherein the flexure structure comprises:
    a flexure configured to allow pitch and roll movement of the slider; and
    a plurality of conductors, the first material comprising a dielectric material and being coupled between the plurality of conductors and the flexure.

15. The gimbal of claim 14 wherein the dielectric material is configured along a portion of the flexure to exert a force on the flexure to deform generally concavely toward and away from the conductors with the changes in environmental humidity conditions.

16. The gimbal of claim 15 wherein the balancing structure is configured to exert a force on the flexure to deform generally concavely away from and toward the conductors with the changes in environmental humidity conditions in opposition to the force exerted by the dielectric material.

17. The gimbal of claim 16 wherein the balancing structure comprises a dielectric material portion coupled to the flexure.

18. The gimbal of claim 14 wherein the flexure comprises:
a pair of generally longitudinal gimbal struts extending from a first end thereof to a crossmember, and wherein the dielectric material of the first material includes dielectric struts running generally longitudinally, proximate, and outside of, the gimbal struts, the dielectric struts supporting the conductors thereon and tending to deform concavely toward the conductors with increases in environmental moisture.

19. The gimbal of claim 18 wherein the balancing structure comprises:
a first portion of material positioned on one of the gimbal struts and tending to deform generally concavely away from the conductors with increases in environmental moisture.

20. The gimbal of claim 19 wherein the balancing structure further comprises:
a second portion of material positioned on a second of the gimbal struts and tending to deform generally concavely away from the conductors with increases in environmental moisture.

* * * * *